(12) United States Patent
Brown et al.

(10) Patent No.: US 7,844,051 B2
(45) Date of Patent: Nov. 30, 2010

(54) TRAPDOOR ONE-WAY FUNCTIONS ON ELLIPTIC CURVES AND THEIR APPLICATION TO SHORTER SIGNATURES AND ASYMMETRIC ENCRYPTION

(75) Inventors: Daniel R. L. Brown, Mississauga (CA); Robert P. Gallant, Corner Brook (CA); Scott A. Vanstone, Campbellville (CA); Marinus Struik, Toronto (CA)

(73) Assignee: Certicom Corp., Mississauga (CA)

( * ) Notice: Subject to any disclaimer, the term of this patent is extended or adjusted under 35 U.S.C. 154(b) by 1416 days.

(21) Appl. No.: 11/272,152

(22) Filed: Nov. 14, 2005

(65) Prior Publication Data

US 2006/0140400 A1 Jun. 29, 2006

Related U.S. Application Data

(60) Provisional application No. 60/626,884, filed on Nov. 12, 2004.

(30) Foreign Application Priority Data

Nov. 11, 2004 (WO) ................ PCT/IB2004/003700

(51) Int. Cl.
*H04L 9/30* (2006.01)
(52) U.S. Cl. ........................ 380/30; 713/150; 713/176
(58) Field of Classification Search .................... 380/1, 380/2, 255; 713/150; 726/2, 22
See application file for complete search history.

(56) References Cited

U.S. PATENT DOCUMENTS

| | | | |
|---|---|---|---|
| 5,146,500 A | | 9/1992 | Maurer |
| 5,159,632 A * | | 10/1992 | Crandall ...................... 380/28 |
| 5,272,755 A * | | 12/1993 | Miyaji et al. .................. 380/30 |
| 5,751,808 A | | 5/1998 | Anshel et al. |
| 6,480,605 B1 | | 11/2002 | Uchiyama et al. |
| 6,507,907 B1 * | | 1/2003 | Takahashi et al. ............ 713/150 |
| 6,959,085 B1 * | | 10/2005 | Hoffstein et al. .............. 380/30 |
| 7,113,594 B2 * | | 9/2006 | Boneh et al. .................. 380/28 |
| 7,587,605 B1 * | | 9/2009 | Venkatesan et al. ......... 713/180 |
| 2002/0194501 A1 * | | 12/2002 | Wenocur et al. ............ 713/201 |
| 2002/0199001 A1 * | | 12/2002 | Wenocur et al. ............ 709/227 |

OTHER PUBLICATIONS

Silverman, Joseph H.; Advanced Topics in the Arithmetic of Elliptic Curves, 1994, pp. 111, Springer-Verlag, New York.

* cited by examiner

*Primary Examiner*—Pramila Parthasarathy
(74) *Attorney, Agent, or Firm*—Brett J. Slaney; John R. S. Orange; Blake, Cassels & Graydon LLP

(57) ABSTRACT

The present invention provides a new trapdoor one-way function. In a general sense, some quadratic algebraic integer z is used. One then finds a curve E and a rational map defining [z] on E. The rational map [z] is the trapdoor one-way function. A judicious selection of z will ensure that [z] can be efficiently computed, that it is difficult to invert, that determination of [z] from the rational functions defined by [z] is difficult, and knowledge of z allows one to invert [z] on a certain set of elliptic curve points. Every rational map is a composition of a translation and an endomorphism. The most secure part of the rational map is the endomorphism as the translation is easy to invert. If the problem of inverting the endomorphism and thus [z] is as hard as the discrete logarithm problem in E, then the size of the cryptographic group can be smaller than the group used for RSA trapdoor one-way functions.

15 Claims, 5 Drawing Sheets

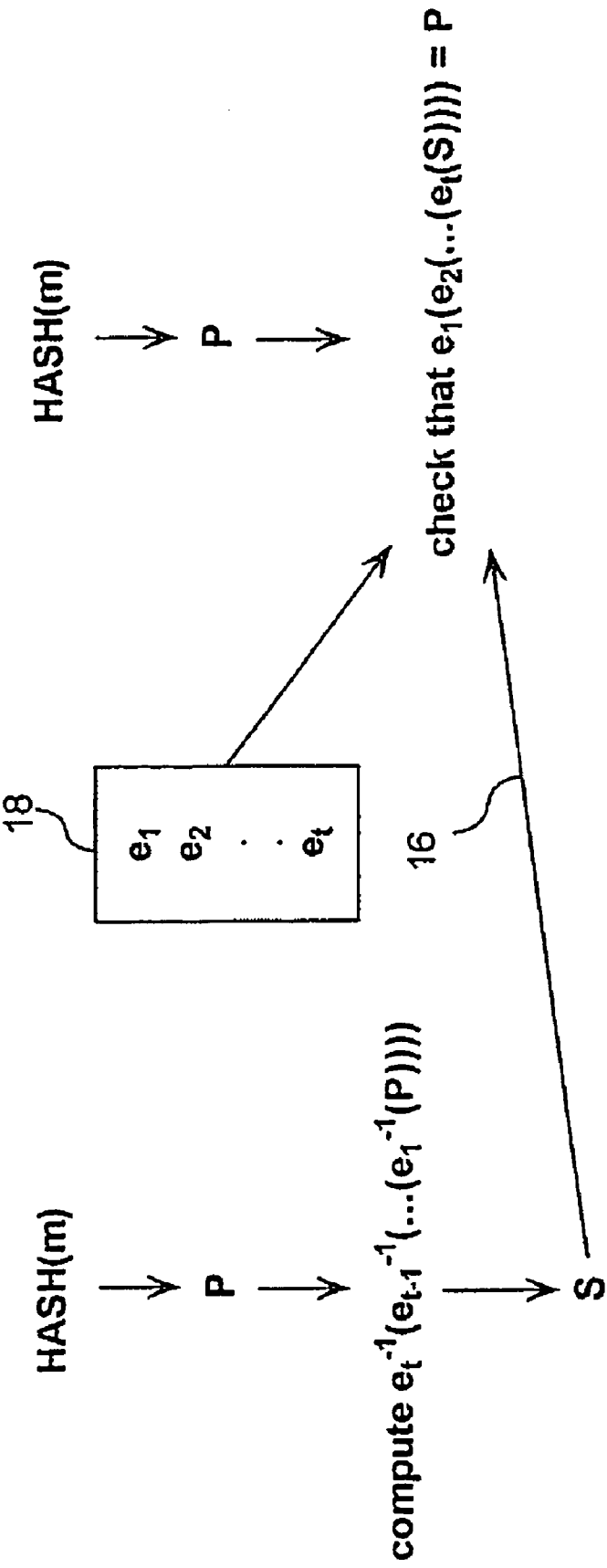

TRAPDOOR ONE-WAY FUNCTIONS ON ELLIPTIC CURVES AND THEIR APPLICATION TO SHORTER SIGNATURES AND ASYMMETRIC ENCRYPTION

This application claims priority from PCT Application No. PCT/IB2004/003700 filed on Nov. 11, 2004 and U.S. Provisional Application No. 60/626,884 filed Nov. 12, 2004.

FIELD OF THE INVENTION

The present invention relates to trapdoor one-way encryption functions and cryptosystems utilising such functions.

DESCRIPTION OF THE PRIOR ART

A trapdoor one-way function (TOWF) is a publicly computable function, which only one entity can invert. A special secret, called a private key, is required to compute the inverse of TOWF.

The classic example of a TOWF is the RSA function based on the relationship $M^{ed} \equiv M \pmod{N}$. The public RSA function w is computed as follows: $W(x) = x^e \bmod N$. The numbers e and N are public values. The number N is chosen to be a product of two secret distinct primes p and q. Inverting the RSA function with the private key operation w, can be done as follows: $W^{-1}(y) = y^d \bmod N$, where $d = (1/e) \bmod (p-1)(q-1)$ and is the private key.

Inverting the RSA function without the private key is believed to be a hard problem Factoring N to obtain the primes p, q is computationally infeasible for large values of N and therefore the private key $w = (p-1)(q-1)$ also maintains secrecy. In fact, the security of much of the online banking currently done depends on the RSA function being hard to invert without the private key. In other words, the world generally believes that the RSA function is a TOWF.

As a TOWF, the RSA function can be used as the basis of a cryptosystem that performs both digital signatures and public-key encryption. To digitally sign a message M with a trapdoor one-way function W one computes $S = W^{-1}(H(M))$ using the private key operation $W^{-1}$ and a public hash function H. The hash function has two purposes: to compress M down to the size of digest which $W^{-1}$ can handle and to prevent some potential attacks involving the conversion of a signature of one message to the signature of a related but unauthorized message. To verify a signature S of message M with a trapdoor one-way function, one checks that $H(M) = W(S)$.

Public-key encryption with a TOWF is somewhat the opposite to signing. Instead of hashing, an encoding scheme E is used. To encrypt a message M, one computes a ciphertext $C = W(E(M))$. To decrypt a ciphertext C, one computes $M = E^{-1}(W^{-1}(C))$. The encoding function serves to adapt M to the size needed for W to be applied, and also to prevent certain kinds of related message attacks.

An alternative cryptosystem is based on the difficulty of the discrete log problem A particularly robust cryptosystem, which bases its security on the discrete log problem utilizes elliptic curves and has the advantage of reduced bandwidth compared with RSA TWOF cryptosystems.

Whilst elliptic curve cryptosystems reduce the bandwidth compared to the RSA TOWF, there is still a need to minimize the bandwidth whilst maintaining the desirable attributes of existing systems. Moreover, TOWF's do not rely on the random number generator and therefore in some circumstances may be easier to implement even though the bandwidth required is greater.

It is therefore an object of the present invention to provide a TOWF cryptosystem to obviate or mitigate the above mentioned disadvantages.

To facilitate the understanding of the underlying principles of the present invention, a review of the mathematical basis of these principles is set forth below.

An elliptic curve E is the set of points (x, y) that satisfy the defining equation of the elliptic curve. The defining equation is a quadratic in y and a cubic in x, and is non-singular. The coordinates x and y are elements of a field, which is a set of elements that can be added, subtracted, multiplied, and divided (with the exception of zero for division). Examples of fields include rational numbers and real numbers. There are also finite fields, which are the fields most often used in cryptography. An example of a finite field is the set of integers modulo a prime q.

Without the loss of generality, the defining equation of the elliptic curve can be in the Weierstrass form. When the field F is derived from the integers modulo a prime $q > 3$, then the Weierstrass equation takes the form $y^2 = x^3 + ax + b$, where a and b are elements of the field F.

The elliptic curve E includes the points (x, y), which are all solutions to the defining equation, and one further point, namely the point O at infinity. The elliptic curve E also has a group structure, which means that the two points P and Q on the curve can be added to form a third point P+Q. The point O is the identity of the group, meaning P+O=O+P=P, for all points P. Addition is associative, so that P+(Q+R)=(P+Q)+R, and commutative, so that P+Q=Q+P, for all points P, Q and R. Each point P has a negative point -P, such that P+(-P)=O. When the curve equation is the Weierstrass equation of the form $y^2 = x^3 + ax + b$, the negative of P=(x, y) is determined easily as -P=(x, -y). The formula for adding points P and Q in terms of their coordinates is only moderately complicated involving just a handful of field operations in the field over which E is defined.

A rational function r(x,y) in two variables over a field is the ratio of two polynomials in two variables each over the same field So r(x,y)=p(x,y)/q(x,y), where p and q are polynomials in x and y. A polynomial in x and y is a sum of terms of the form $a x^m y^n$, where a is a field element (possibly depending on m and n), and m and n are non-negative integers. For example, $x^2 y - 3y^4 + 1$ is a polynomial in x and y. For any rational function r(x, y) and field elements u and v, there is a value of the rational function r(x,y) at the point (u, v). The value is a field element or the point at infinity, and is written r(u, v). The value r(u, v) is obtained simply by substituting each occurrence of the variable x by the field element u and each y by v, and then evaluating all the field operations such as multiplication, addition and division. Occasionally division by zero results, which generally indicates that the value r(u, v) is actually infinity, which is regarded as an exception because the value is not in the field. Thus, it is possible to evaluate r(x,y) for points (x,y) on the curve. It is also possible to define the value of r(x,y) at the point O, this enabling evaluation of r on each point of the curve.

A rational map on an elliptic curve E is a pair of rational functions r(x,y) and s(x,y) such that if (u, v) is a point on E, then (t, w)=(r(u, v), s(u, v)) is also a point on E. More generally, this needs to also hold if (u,v) is replaced by O, and furthermore if it is acceptable for (t, w) to be O, which corresponds to t and w both being infinity.

Rational maps on elliptic curves can actually be added just like points on the curve. The addition rules are similar, except that instead of doing operations with field elements, one instead does operations with rational functions, that is, with the symbolic functions of x and y.

A rational map (r, s) on E is considered equivalent to another rational map (r', s') on E if r is equivalent to r' and s is equivalent to s', as rational functions on E.

A special kind of rational map is an endomorphism. An endomorphism e, is a rational map e=(r, s) with the additive property, that is e(P+Q)=e(P)+e(Q) for any two points P and Q. An important theorem in elliptic curve theory says that if e is a rational map with the property e(O)=O, then e is also an endomorphism. This theorem considerably simplifies the determination of whether a given rational map is an endomorphism.

An important example of an endomorphism is e=[m] which is defined by e(P)=mP, that is, the sum of m copies of the point P. Because the addition law for curve E is defined by rational functions, then so is the iterated sum mP of m copies of P, because these rational functions can be iterated. Therefore e(P) is a rational map. Because the addition operation on the curve E is associative, we have e(P+Q)=m(P+Q)=m(P)+m(Q)=e(P)+e(Q) for e=[m]. Therefore, e is an endomorphism because it has the additive property.

If there is an endomorphism different than [m], then E is said to have complex multiplication. Elliptic curves defined over finite fields always have complex multiplication. In other words, they always have an endomorphism e which is different from [m] for all integers m.

A powerful theorem of elliptic curve theory says that any endomorphism e is equivalent to a unique rational map of the form (r(x), cyr'(x)), where r(x) is a rational function of a single variable, c is a constant field element, and r'(x) is the derivate of r(x). This result is not at all obvious, but if e is in the form (f(x,y), g(x,y)), it is not too difficult to determine r(x), as outlined below.

To illustrate, one replaces each occurrence of $y^2$ in f(x, y) with a polynomial that is linear or constant in y. For example, if the curve's defining equation is $y^2=x^3+ax+b$, then each $y^2$ can be replaced by $x^3+ax+b$, which is constant in y. Apply this as many times as necessary so that the numerator and denominator do not have any powers of y higher than 1, in other words they are linear in y. The modified f(x,y) has the form (a(x)+b(x) y)/(c(x)+d(x)y), where a, b, c, and d are polynomial functions, not to be confused with previous uses of these variables. The y can be eliminated from the denominator by multiplying the top and bottom by (c(x)−d(x) y), which gives $c(x)^2-d(x)^2 y^2 = c(x)^2 - d(x)^2 (x3+ax+b)$ in the bottom. The $y^2$ in the numerator can also be eliminated This gives a form g(x)+h(x) y where g(x) and h(x) are rational functions in x. It can be proven that h(x)=0, because as e is an endomorphism we have e(−P)=−e(P), so e(x,−y)=−e(x,y), thus g(x)+h(x) y=g(x)−h(x) y, for all (x,y) on the curve. So now we have found r(x) as g(x). It is clear that r(x) found in this way is unique.

Similarly, the rational function g(x,y) can be expressed as a linear function h(x)+y k(x) where h(x) and k(x) are rational functions of x, and it can be shown that h(x)=0 by similar reasons. This means that k(x) can be determined, which provides a means to find the constant c in the form (r(x), cyr'(x)). Alternately, c could be found by differentiating r(x), and then evaluating e at a some point P to solve for c.

Every endomorphism has an action on an elliptic curve group that corresponds to a quadratic algebraic integer. A quadratic algebraic integer z is a complex number such that $z^2+uz+v=0$ for some integers u and v. The endomorphism e corresponds to this algebraic integer if $e^2+[u]z+[v]=[0]$, where the addition here is the addition of rational maps, as explained above. In this case, we can write e=[z], where [ ] indicates the rational map corresponding to a rational integer.

All real integers are quadratic algebraic integers, and the endomorphism [m] corresponds to the integer m. A quadratic algebraic integer that is not a real integer is the complex number i, the square root of −1, which satisfies quadratic equation $i^2+1=0$. For each quadratic algebraic integer that is not a real integer, there are only a limited set of elliptic curves that have [z] as an endomorphism. Known results give theoretical procedures for determining such curves, as well as a way of determining [z] as a rational map.

Generally, the degree of endomorphism e is the number of points P such that e(P)=O. More precisely, this is called the separable degree of e. The actual degree is the product of the separable degree and something else called the inseparable degree. When e is expressed in its canonical form as (r(x),cyr'(x)), the degree of the numerator of r(x) is the degree of e, and the degree of the denominator of r(x) is one less. (Here we assume the numerator and denominator of r(x) to be coprime) Furthermore, for e=[z], we generally have the degree of e as $|z|^2$. The degree of the endomorphism [m], for example, is thus $|m|^2=m^2$.

In conventional elliptic curve cryptography, the endomorphism [m] is evaluated frequently. The number m represents a private key, and [m]P=mP represents a public key. The function [m] can be computed efficiently, even for a large value of m, much faster than one could add up the $m^2$ terms that would appear in the fully expanded polynomial forms of the numerator and denominators of r(x) for [m]. The crucial observation here is that a large degree endomorphism can be efficiently computed.

The following example lists every possible endomorphism of degree 2 on any elliptic curve. This list is complete up to equivalence of rational maps and elliptic curves. These are taken from Silverman's *Advance Topics in the Arithmetic Elliptic Curves* (Silverman's).

The first is e=[z]=[1+i], defined on the curve E:

$$y^2 = x^3 + x, \text{ as:}$$

$$e(x, y) = \left(\frac{x^2+1}{z^2 x}, \frac{y(x^2-1)}{z^3 x^2}\right)$$

Notice that z appears as a rational function defining the action of e, so e is only defined when E is defined over a field F that contains a value corresponding to z. (This comment also applies to the two endomorphism e below)

The second is e=[z]=[√(−2)], defined on E:

$$y^2 = x^3 + 4x^2 + 2x, \text{ as:}$$

$$e(x, y) = \left(\frac{x^2+4x+2}{z^2 x}, \frac{y(x^2-2)}{z^3 x^2}\right)$$

The third is e=[z]=[(1+√(−7))/2], defined on E:

$$y^2 = x^3 - 35x + 98, \text{ as:}$$

$$e(x, y) = \left(\frac{x^2 + x(z^2-2) - 7(1-z)^4}{z^2(x+z^2-2)}, \frac{y((x+z^2-2)^2 + 7(1-z)^4)}{z^3(x+z^2-2)^2}\right)$$

SUMMARY OF THE INVENTION

The inventors have recognized that it is possible to use the attributes of elliptic curve cryptosystems to obtain a TOWF that provides a robust cryptosystem with a reduced bandwidth.

In one aspect, the present invention provides a cryptographic system operating on an elliptic curve E of order n. The cryptosystem has an endomorphism [z] corresponding to a quadratic algebraic integer z that has the form $z^2+uz+v=0$, where u and v are secret integers, and v is relatively prime to n; a public key operation to apply the endomorphism [z] to cryptographic data x to obtain modified data x'; and a private key operation to apply [−w]([u]+[z]) to the modified data x' in order to obtain the data x, where w is an integer and wv=1 mod n.

In another aspect, the present invention provides method for performing cryptographic operations in a cryptographic system operating on an elliptic curve E of order n. The method comprises the steps of deriving an endomorphism [z] corresponding to a quadratic algebraic integer z that has the form $z^2+uz+v=0$, where u and v are secret integers, and v is relatively prime to n; applying a public key operation using the endomorphism [z] to cryptographic data x to obtain modified data x'; and applying a private key operation using [−w][u]+[z] to the modified data x' in order to obtain the data x, where w is an integer and wv=1 mod n.

BRIEF DESCRIPTION OF THE DRAWINGS

An embodiment of the invention will now be described by way of example only with reference to the accompanying drawings, in which:

FIG. 6 is a schematic representation showing an application of the trapdoor one-way function of FIG. 2 for aggregated signatures with a single message and multiple trapdoor one-way functions for multiple signers.

DETAILED DESCRIPTION OF THE INVENTION

Figure 1:
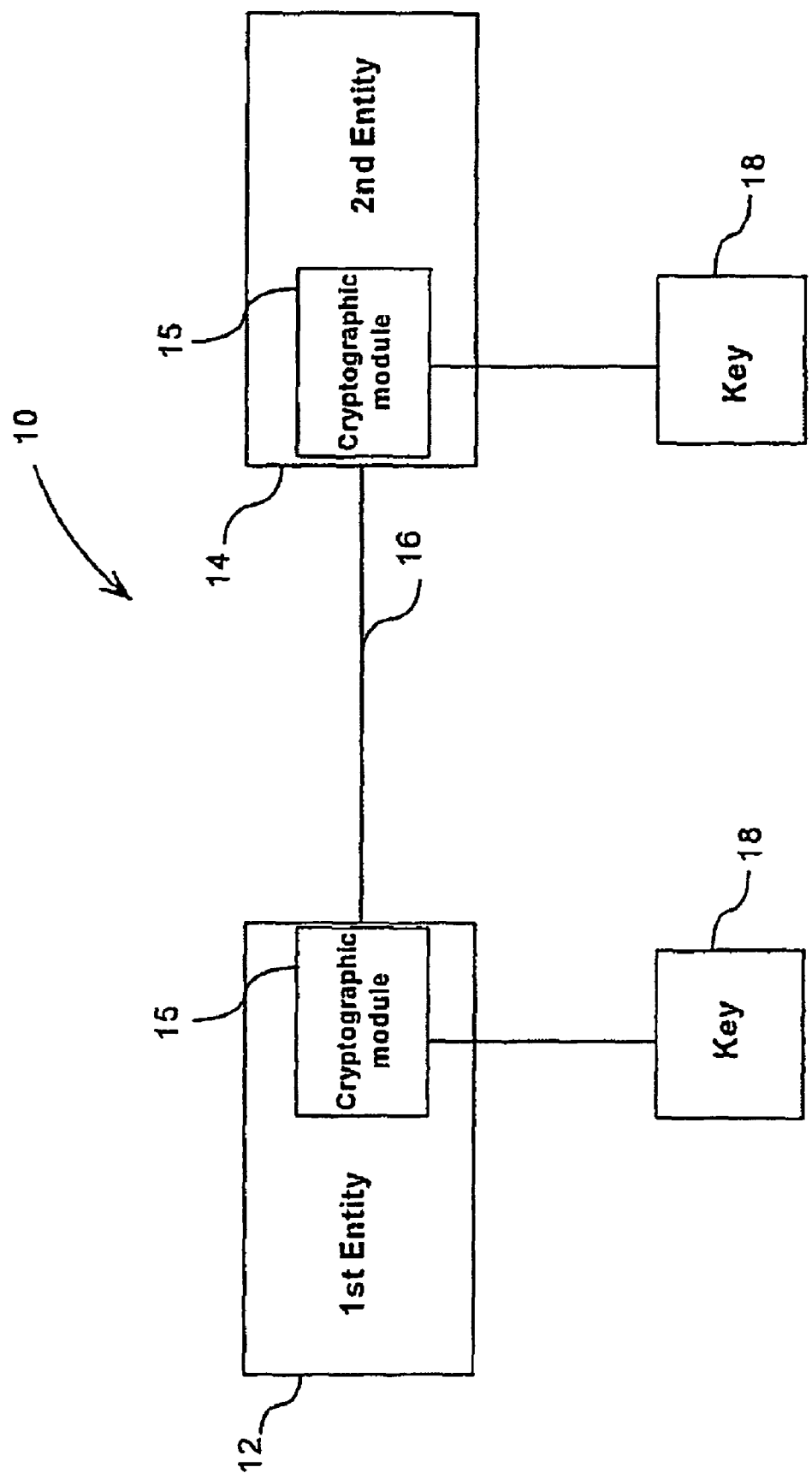
FIG. 1 is a schematic representation of a cryptographic exchange scenario.

Referring therefore to FIG. 1, a cryptosystem 10 has a first entity 12, and a second entity 14 that communicate via a communication channel 16. The first entity 12 and second entity 14 each have a cryptographic module 15 that applies public key functions or private key functions 18 available to both entities 12, 14. Each entity 12, 14 will utilize the key functions 18 with the TOWF to obtain encryption/decryption or signing/verifying as described above.

In order to implement such a system, it is necessary to determine a suitable TOWF with corresponding public key functions and private key functions. The inventors have recognized that a suitable TOWF may be obtained by use of a quadratic algebraic integer z. One then finds a curve E and rational map defining [z] on E. The rational map [z] is the TOWF. Judicious selection of z will ensure that it has the necessary cryptographic attributes, namely:

(a) [z] can be efficiently computed
(b) that [z] is difficult to invert
(c) determination of z from the rational functions defining [z] is difficult, and
(d) knowledge of z allows one to invert [z] on a certain set of elliptic curve points.

More generally, one can use a rational map r between two different curves E and E'. The rational map can be used as a TOWF. For ease of implementation, however, it is more convenient to use E=E'. A rational map from E to E is the preferred implementation.

Because every rational map (i.e. from E to E) is a composition of a translation and an endomorphism, where the translation is easy to determine and invert, the most secure part of the rational map is the endomorphism. Therefore an endomorphism is the preferred implementation of the rational map.

The inventors have recognized that one potential way to calculate the trapdoor inverse, for inverting z, is to use the quadratic equation for z: $z^2+uz+v=0$, where u and v are integers. Dividing this equation by vz gives $(z+u)/v+(1/z)=0$. Hence $(1/z)=−(z+u)/v$. Now, (1/z) is not generally a quadratic algebraic integer. More precisely, if z has degree greater than 1, then (1/z) is not a quadratic algebraic integer. Therefore, there is no endomorphism that inverts [z]. Instead there is a dual endomorphism [z']=[−(z+u)], which satisfies [z][z']=[v]. In a specific field F, the order n of the elliptic curve E can sometimes be relatively prime to v, which means there is an integer w such that wv=1 mod n. This means that [w] acts as an inverse of [v] for the points of E defined over F.

In this case, the action of [z] on E(F) is invertible by the endomorphism [w][z']=[−w(z+u)]. If [z] can be found efficiently, then it is likely that [−w(z+u)] can as well. An alternate expression for this is [−w]([u]+[z]).

Accordingly, it is possible to utilize the endomorphism [z] as the public key operation and the relationship [−w]([u]+[z]) as the private key operation.

The integers u, v are maintained secret and are only available to the entity performing the private key function.

It will be appreciated that this will be specific to the field F and will not be true for E defined over another field F'. The points of E defined over F are sometimes indicated as E(F) to emphasize that points with coordinates outside of F are not under consideration.

In order for [z] to be a trapdoor one-way function, it should be computationally infeasible to determine u and v from the public definition of [z], otherwise its inverse on E(F) is efficiently computable as [−w]([u]+[z]). Therefore, [z] needs to be given in a form that does not allow an easy determination of u and v.

By providing [z] as a pair of rational functions, it is believed that u and v cannot easily be determined. Typically, the first coordinate is a function of x only, so that [z] is somewhat in canonical form (r(x), g(x, y)), then the description for evaluating r(x) may potentially reveal the degree of the numerator of r(x), even though the full expansion of r(x) as a ratio of two polynomials may be infeasible due to the large number of terms. Since the degree of [z] is v, it is possible that the description of [z] will reveal v. Therefore, to make sure that [z] is a one-way trapdoor, it is important to ensure that u is also not revealed, otherwise [z] could be inverted, as described above.

According to Silverman's, determining the endomorphism ring of a general elliptic curve is a non-trivial problem. Since v and u essentially determine the endomorphism ring, up to an integer factor, it is generally infeasible to determine v and u from a description of the elliptic curve alone. It is therefore plausible that from the description of a single complex endomorphism, it is still a non-trivial problem to determine the endomorphism ring. In particular, this means it is still plausible that determining u from the description of [z] as a pair of rational functions is a non-trivial problem.

Accordingly, the degree of z should be chosen such that it has a reasonably large order. This helps to ensure that all possible values of u cannot be exhausted using the relationship $u^2 < 4v$. This follows from above, because z must be an imaginary complex number.

One possible construction for [z] is based on the following observations. As discussed above, if $e=[z]=(r(x), cyr'(x))$ has degree m, then $r(x)=p(x)/q(x)$ where p and q are polynomials of degree m and m−1 respectively. The kernel of e is the set of m points elliptic $O=Z_1, Z_2, \ldots, Z_m$, such that $e(Z_j)=O$ for j from 1 to m. If $Z_j=(z_j, y_j)$ for j from 2 to m, then it can be assumed that $q(x)=(x-z_2)(x-z_3)\ldots(x-z_m)$. Moreover, $mZ_j=O$, since $[z'][z]=[m]$ where z' is the conjugate of z as determined above as $mZ_j=[m]Z_j=[z'][z]Z_j=[z']O=O$. Furthermore, the kernel of e is a subgroup of order m in the elliptic curve E, though not necessarily as a part of E(F). The elliptic curve, as a whole, generally has at least m+1 such subgroups.

Next, consider the elliptic curve containing the point $B=(0, \sqrt{b})$. Suppose that there is some point W such that $[z]W=B$. Let $W_j=W+Z_j$ for j from 1 to m. (Note $W_1=W+Z_1=W+O=W$) Suppose that $Wj=(wj, uj)$ for j=1 to m. Then $p(x)=d(x-w_1)(x-w_2)\ldots(x-w_m)$ for some constant d.

Notice that $p(x)=d(x-w_1)u(x)$ where the roots of $u(x)$ are essentially a rational function of the roots of $q(x)$. When the roots of two polynomials have a simple relationship such as this, there is a transformation of the coefficients of the polynomial. For example if the roots of $u(x)$ are the squares of the roots of $q(x)$ then $u(x)=q(\sqrt{x})q(-\sqrt{x})(-1)^{deg\ q(x)}$. In this way, it is seen that the ability to evaluate $q(x)$ provides a means to evaluate $u(x)$.

Applying the above observations, one may search for a subgroup of order m in some elliptic curve E, whose finite x-coordinates are the zeros of a low Hamming Weight polynomial $q(x)$. It is desirable to have a low Hamming Weight polynomial $q(x)$ because they are efficient to evaluate. One would then find a point W as mentioned above, which allows one to compute the numerator $p(x)$ efficiently, as outlined above. Once $p(x)$ and $q(x)$ can be evaluated, then $r(x)$ can be evaluated.

An illustration of how one may find such polynomials $p(x)$, $q(x)$ is as follows. Note that if $Z_j$ is in the kernel of [z] then so is $-Z_j$ and thus $z_j$ can appear as a double root of $q(x)$. Suppose that $q(x)$ has a degree m that is prime. Suppose further that m is an Elkies prime, the precise meaning of which is not a concern for the following discussion. This means that $q(x)=s(x)^2$ for a polynomial $s(x)$ of degree $(m-1)/2$, which is a factor of the $m^{th}$ division polynomial. The Schoof-Elkies-Atkin (SEA) algorithm for counting points on an elliptic curve E(F) includes a step where a polynomial of the form $s(x)$ is found. The coefficients of the polynomial $v(x)$ are found by a recursion equation. Therefore, methods are known for constructing such a polynomial. In the SEA algorithm, such $s(x)$ are found for relatively small values of m, but for the present purpose, it is advantageous to make m large.

Another possible approach is to choose an irreducible polynomial $s(x)$ of low Hamming weight. Let z be one of its roots, where z is the x-coordinate of some point over the elliptic curve E. The point may have a finite order m. This finite order will hold for any root z of $s(x)$, by applying Galois automorphisms. If it is also the case that these points arising from the roots of $s(x)$ are closed under, that is, they form a subgroup of E, then $s(x)$ has the desired form. For this to happen, we would basically need a Galois automorphism g and a point P on E such that $g(P)=2P$. By searching for a g, P, and E such that this is possible, one may be able to find a polynomial $s(x)$ of the desired form. In practice, the y-coordinate can be ignored because it can only take one of two values.

If the endomorphism's kernel intersects the group E(F) at only the point O, then the action of the endomorphism e on the group E(F) is invertible. In this case, the endomorphism e is an automorphism of the group E(F). Generally the group E(F) will be cyclic, and in the following discussion, we assume that E(F) is cyclic. If e is an automorphism of a cyclic group of order n, then an algorithm realized by the inventors determines an integer d such that $e(G)=dG$, where one uses additive notation for the group. The cost of this algorithm depends on the factorization of n−1. It is known that random values of n generally have a factor f that is approximately $n^{1/3}$. Given a factor of this size, the algorithm can determine d in a constant multiple of f steps. This is considerably faster than the generic algorithms for finding d given dG. These generic algorithms take $n^{1/2}$ steps.

Therefore, it is desirable that the group E(F) has order n such that n−1 does not have a factor f near to $n^{1/3}$. An alternative to choosing n in this way is simply to choose n slightly larger, so that cost of an attack of $n^{1/3}$ is out of reach for the adversaries under consideration. For example, at a security level of 80 bits, such a larger n could be chosen so that n is approximately $2^{240}$, and at a security level of 128 bits, n could be chosen so that n is approximately $2^{384}$. However, for efficiency reasons it is preferable to use a smaller n, and therefore it is presumed that the extra work necessary to ensure n−1 has a size similar to $n^{1/3}$ will be undertaken.

Figure 2:
FIG. 2 is a schematic representation showing an application of a trapdoor one-way function.
Figure 2:
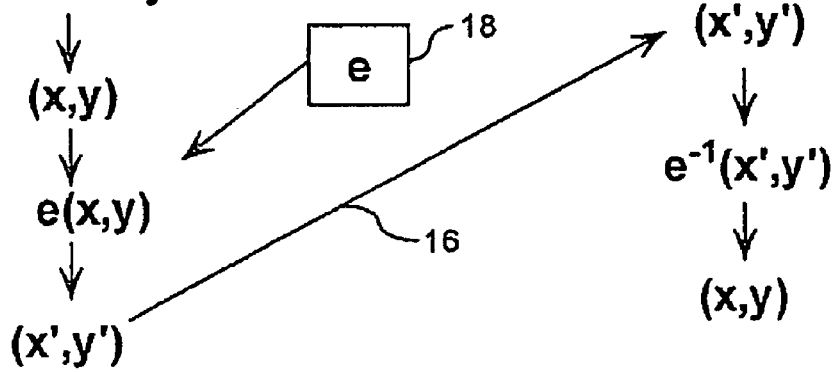

The manner in which an endomorphism e would be used is generally shown in FIG. 2. The first entity 12 takes an x value. It could choose one of the two corresponding y values arbitrarily. It would then apply the public key function [z] as a rational map $e=(r(x), g(x,y))$ and evaluate $e(x, y)$ to arrive at some value (x', y'). This would be the basic public key operation. A second entity 14 receives the message (x', y') and then applies $e^{-1}$ to get the value (x, y). This would be the basic private key operation $[-w]([u]+[z])$. Notice that if y is changed to −y, the y' changes to −y', but x' and x are unaffected. Therefore y can more or less be ignored for all practical purposes.

Figure 3:
FIG. 3 is a schematic representation showing an application of the trapdoor one-way function of FIG. 2 for encryption.
Figure 3:

To apply this to encryption as shown in FIG. 3, the first entity 12 sets x to the plaintext and x' to the ciphertext by application of the public key function [z]. Known sophisticated approaches to public key encryption generally apply some randomized padding to the plaintext x, so that, among other things, repeated encryption of the same plaintext give different ciphertexts. The second entity 14 decrypts the ciphertext x' using the private key function to obtain plaintext x.

Figure 4:
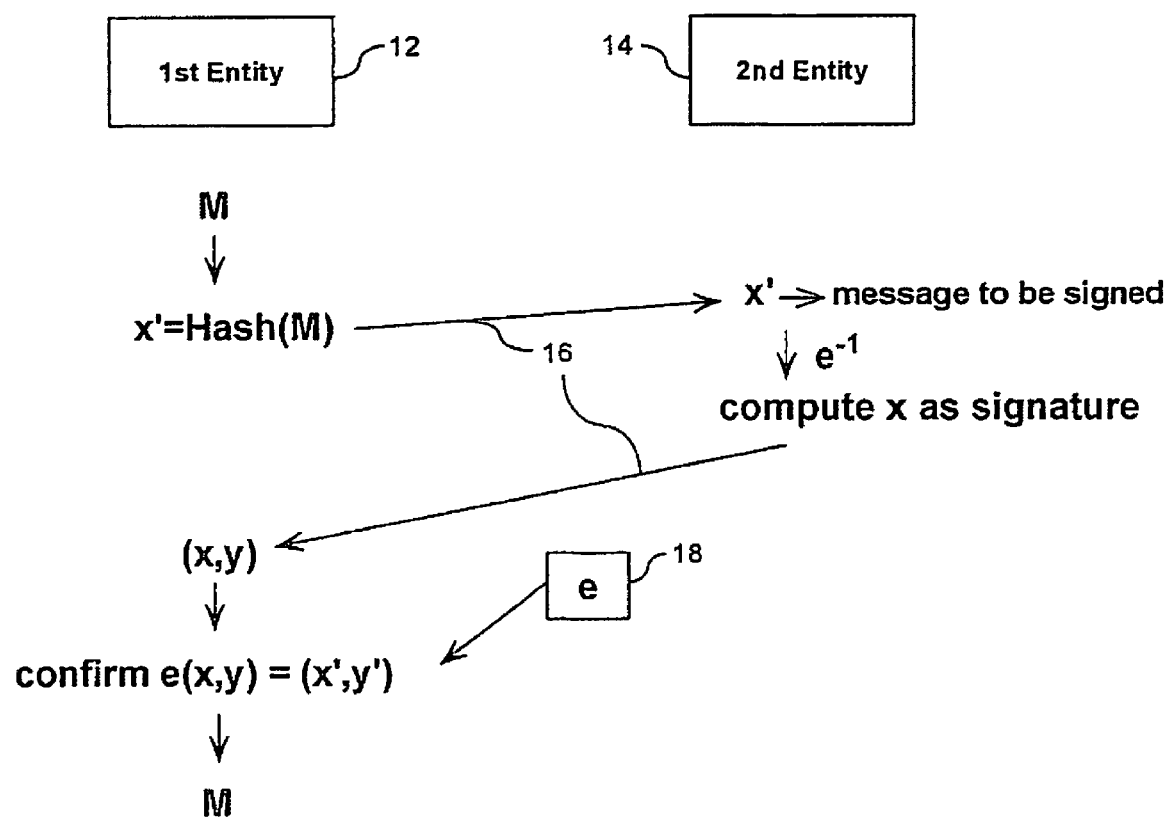
FIG. 4 is a schematic representation showing an application of the trapdoor one-way function of FIG. 2 for digital signatures.

To apply this to signatures as shown in FIG. 4, the second entity 14 sets x' to be the message to be signed, and computes x as the signature by application of the private key function. Generally some hashing is used to create x' from a longer message, which is a standard technique for digital signatures. The first entity 12 uses the public key operation e to confirm that $e(x, y)=(x', y')$. The hash function is one-way, so the first entity cannot forge a signature by starting from (x, y) and applying e to get (x', y'), because the next step would be to find a message M, such that x'=Hash (M), which is considered infeasible for a one-way hash function.

If the problem of inverting [z] is as hard as the discrete logarithm problem in E, then the size of the cryptographic group can be smaller than the group used for the RSA TOWF. For example, a 3072 bit RSA modulus is consider to be roughly as secure as an elliptic curve defined over a 256-bit field. The security level of both these objects is considered to be 128 bits, which is a commercial grade security level now most widely used across the Internet, such as for online banking. The elliptic curve trapdoor one-way function [z], the size of signature x or basic ciphertext x' is 256 bits, whereas for RSA the size is 3072 bits.

Comparing to conventional elliptic curve cryptography (ECC), a signature for a 256-bit elliptic curve is about 512 bits long, which is twice the size of the signature for an elliptic curve TOWF. A similar savings is possible for encryption.

In another embodiment and application of the present invention the TOWF is applied to the aggregation of signatures or ciphertexts. The following will be explained for signatures, but it will be appreciated that the details for ciphertexts are quite similar.

Aggregation of signatures means a single signature represents a multiplicity of messages signed by a single signer, or a single message signed by a multiplicity of signers, or a multiplicity of messages signed by a multiplicity of signers.

Figure 5:
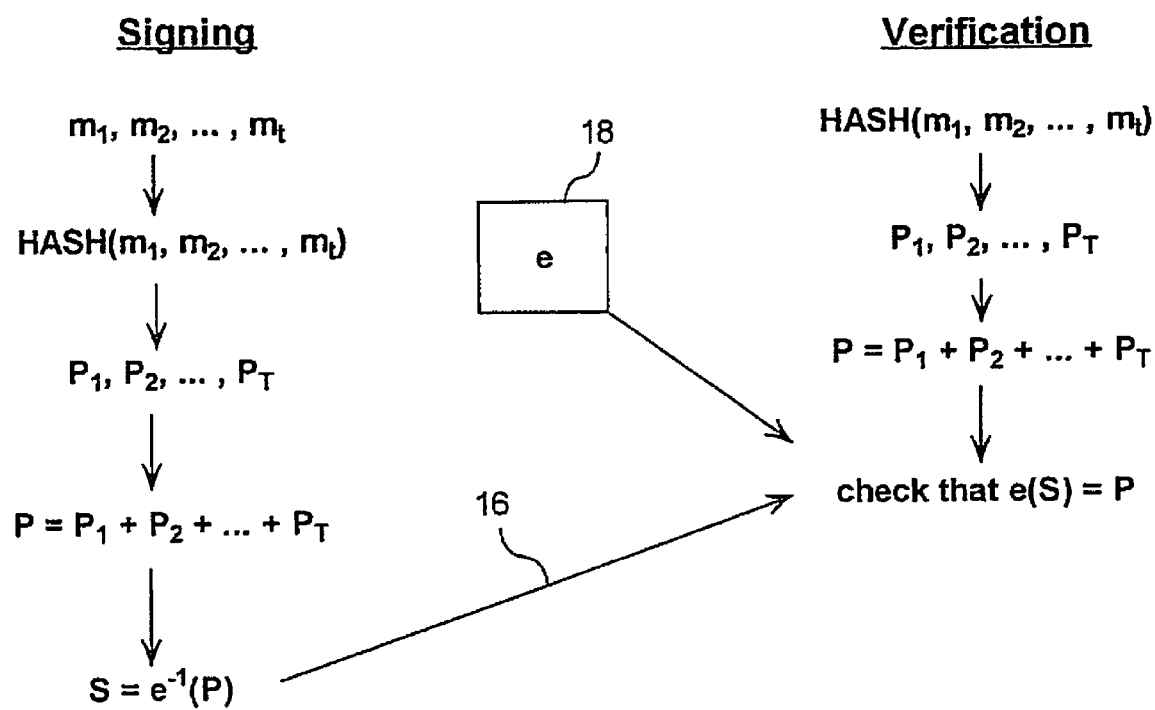
FIG. 5 is a schematic representation showing an application of the trapdoor one-way function of FIG. 2 for aggregated signatures.

Referring now to FIG. 5, to sign t messages $m_1, m_2, \ldots, m_t$ a signer (e.g. first entity 12) hashes each message and converts each hash to an elliptic curve point, yielding t points $P_1, \ldots, P_t$ which are then added together to yield a point $P = P_1 + \ldots + P_t$. The signer then applies the inverse function $e^{-1}$ to obtain the signature $S = e^{-1}(P)$, which is a single message for multiple messages. Verification by another entity (e.g. second entity 14) consists then of hashing the messages, converting each hash to a point, summing to a total P, and then applying the public key 18 operation e to S by checking if $e(S) = P$. The advantage of doing this over simply concatenating the messages is to achieve greater flexibility for the signer wishing to change parts of the message, because the signing is additive.

The procedure described above does not impose an order of signing individual message components, i.e., signature verification is relative to an (unordered) set of signatures signed by the same entity. It should be noted, however, that this procedure can easily be generalized towards weighted sums of individual signatures, rather than the sum of individual signature components $S_1, \ldots, S_t$, provided that the individual scalar multiples (the 'weights') can be retrieved or derived by the verifying entity. This would allow the enforcement of ordering in the signing process of these t messages, by making the weights dependent on the applicable ordering.

Referring now to FIG. 6, if t different signers (e.g. collectively the first entity 12) use the same elliptic curve group and have different TOWF $e_1, \ldots, e_t$, then they may form an aggregate signature of a single message as follows. To sign a message m, the first signer of the first entity 12 computes a hash of the message and convert the hash to an elliptic curve point P. Then they together (i.e. all signers of the first entity 12) compute $e_t^{-1}(e_{t-1}^{-1}(\ldots (e_1^{-1}(P))))$, by each applying their private key operation, where signing takes place by entities 1, 2, ..., t in order. Verification (e.g. by the second entity 14) consists of applying each of the corresponding public key 18 operations, in reverse order, and checking whether the resulting point P corresponds to the hash value of the signed message m.

Generally, elliptic curve endomorphisms commute, so the order in which signing of a single message by multiple entities seems irrelevant. It should be noted, however, that this procedure can easily be generalized such as to enforce an ordering in the signing process. This can be realized by, for example, having each signing entity apply an offset to the signature computed, as described below.

Suppose the individual signature by entity i on point P is $e_i^{-1}(P+A_i)$, where the elliptic curve point $A_i$ is unique for entity i. Then the ordered aggregate signature over message m by entities 1, 2, ..., t is obtained by hashing m and converting this to the elliptic curve point P (as before), and subsequently having each of the signing entities apply his own signing operation on the resulting value. This results in $S_1 = e_1^{-1}(P+A_1)$, $S_2 = e_2^{-1}(S_1+A_2)$, ..., $S_t = e_t^{-1}(S_{t-1}+A_t)$, where $S_t$ is the resulting aggregate signature. Signature verification is now a trivial modification of the procedure described above, provided the individual offsets $A_1, \ldots, A_t$ can be retrieved or derived by the verifying entity and depends on computing the sequence $S_{t-1} = e_t(S_t) - A_t$, $S_{t-2} = e_t(S_{t-1}) - A_{t-1}, \ldots, S_1 = e_2(S_2) - A_2$, $P = e_1(S_1) - A_1$ and checking whether the elliptic curve point P corresponds with the hash value of the signed message m.

Above, a modification of the original scheme is described such as to enforce an ordering of the signing process using offsets $A_i$ that are unique for each of the signing entities. It will be seen that variations hereof are possible, such as defining $S_i = e_i^{-1}(f(P,i))$ rather than $S_i = e_i^{-1}(P+A_i)$, where f is a mapping on E with the property that one can efficiently re-compute P from f(P,i) and public information associated with signing entity i. The ordered signing of a single message by multiple entities could be useful for signing off, for example, projects in a large organization, where multiple signatures are required and a project needs to be signed off by authorized parties involved in a particular hierarchical order (e.g., bottom-up).

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A cryptographic system operating on an elliptic curve E of order n, said cryptographic system comprising a first correspondent for cryptographically processing data for a second correspondent; said first correspondent comprising a memory and a first cryptographic processor, said first cryptographic processor being configured for:

storing in said first memory, an endomorphism [z] from one group to another corresponding to a quadratic algebraic integer z that has the form $z^2 + uz + v = 0$, where u and v are secret integers, and v is relatively prime to n;

identifying said endomorphism [z] as a public key operation;

determining a private key operation $[-w]([u]+[z])$, where w is an integer and $wv = 1 \mod n$;

obtaining data x to be cryptographically processed;

applying one of said public key operation and said private key operation to said data x to obtain modified data x'; and providing said modified data x' to said second correspondent in said cryptographic system to enable a second cryptographic processor at said second correspondent to perform a complementary cryptographic operation on said modified data x' using the other of said public key operation and said private key operation.

2. A cryptographic system according to claim 1 wherein said integer z is a complex number having real and imaginary components.

3. A cryptographic system according to claim 1 wherein said endomorphism [z] is represented as a rational map.

4. A cryptographic system according to claim 1 wherein said cryptographic data x comprises a message m, said public key operation by said first cryptographic processor operates to encrypt said message m to obtain an encrypted message m', and application of said private key operation by said second cryptographic processor decrypts said encrypted message m' to obtain said message m.

5. A cryptographic system according to claim 1 wherein said data x comprises a message m to be signed, said first cryptographic processor applies said private key operation on said message m to obtain a signature s, and said complementary operation comprises said public key operation on said signature s to verify said signature.

6. A cryptographic system according to claim 5 wherein said message m is generated from a hash function applied to an original message M by said second correspondent.

7. A cryptographic system according to claim 1 wherein said cryptographic data x comprises a plurality of messages to receive a signature by said first correspondent, said first correspondent applies said private key operation on a combination of said plurality of messages to obtain said signature, and said public key operation is used by said second correspondent to verify said signature and thereby verify each of said plurality of messages.

8. A method of a first correspondent cryptographically processing data in a cryptographic system operating on an elliptic curve E of order n for a second correspondent, said method comprising:

at said first correspondent, a first cryptographic processor storing in a memory, an endomorphism [z] from one group to another corresponding to a quadratic algebraic integer z that has the form $z^2+uz+v=0$, where u and v are secret integers, and v is relatively prime to n;

said first cryptographic processor identifying said endomorphism [z] as a public key operation;

said first cryptographic processor determining a private key operation $[-w]([u]+[z])$, where w is an integer and $wv=1 \mod n$;

said first cryptographic processor obtaining data x to be cryptographically processed;

said first cryptographic processor applying one of said public key operation and said private key operation to said data x to obtain modified data x'; and said first cryptographic processor providing said modified data x' to said second correspondent in said cryptographic system to enable a second cryptographic processor at said second correspondent to perform a complementary cryptographic operation on said modified data x' using the other of said public key operation and said private key operation.

9. A method according to claim 8 wherein said integer z is a complex number having real and imaginary components.

10. A method according to claim 8 wherein said endomorphism [z] is represented as a rational map.

11. A method according to claim 8 wherein said cryptographic data x comprises a message m, application of said public key operation by said first cryptographic processor encrypts said message m to obtain an encrypted message m', and application of said private key operation by said second cryptographic processor decrypts said message m from said encrypted message m'.

12. A method according to claim 8 wherein said data x comprises a message m to be signed; said method comprising said first cryptographic processor applying said private key operation to operate on said message m to obtain a signature s, and said complementary operation comprising said public key operation on said signature s to verify said signature s.

13. A method according to claim 12 wherein said message m is generated from a hash function applied to an original message M by said second correspondent.

14. A method according to claim 8 wherein said cryptographic data x comprises a plurality of messages to receive a signature, said private key operation operates on a combination of said plurality of messages to obtain said signature, and said public key operation operates on said signature to verify said signature and thereby verify each of said plurality of messages.

15. A method according to claim 8 wherein said data x comprises a message to be signed by a plurality of signers, said private key operation comprises a plurality of operations corresponding to each of said plurality of signers, said plurality of operations being applied successively to said message to obtain a signature, said public key operation comprising a plurality of corresponding operations corresponding to each of said plurality of signers, said corresponding operations being applied successively in opposite order to said plurality of operations corresponding to each of said plurality of signers to verify said signature.

\* \* \* \* \*